March 27, 1928.  
W. MOHR  
MACHINE FOR DIVIDING AND WORKING DOUGH  
Filed July 30, 1926  
1,664,372  
4 Sheets-Sheet 1

Inventor:  
Wilhelm Mohr  
by Sona, Kehlenbeck & Farley  
Attorneys

March 27, 1928.  1,664,372
W. MOHR
MACHINE FOR DIVIDING AND WORKING DOUGH
Filed July 30, 1926   4 Sheets-Sheet 3

Inventor:
Wilhelm Mohr
by Lovka, Kehlenbeck & Farley
Attorneys.

March 27, 1928.  1,664,372
W. MOHR
MACHINE FOR DIVIDING AND WORKING DOUGH
Filed July 30, 1926  4 Sheets-Sheet 4
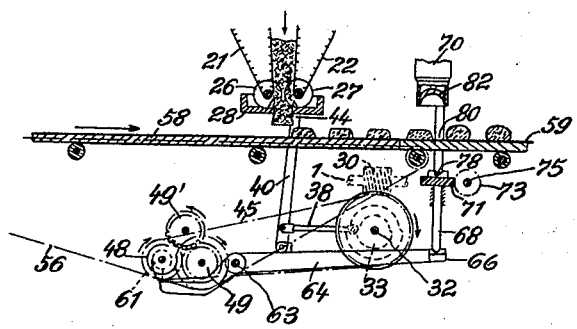
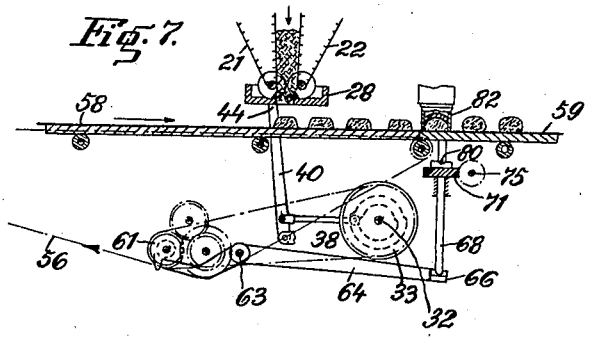
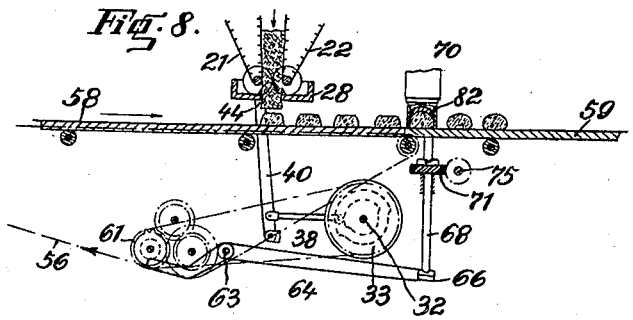
Inventor:
Wilhelm Mohr
by Lorka, Kehlenbeck & Farley
Attorneys Patented Mar. 27, 1928.

1,664,372

UNITED STATES PATENT OFFICE.

WILHELM MOHR, OF DOLAU, NEAR HALLE, GERMANY.

MACHINE FOR DIVIDING AND WORKING DOUGH.

Application filed July 30, 1926, Serial No. 125,912, and in Germany October 13, 1921.

My invention relates to machines for dividing and working dough and it is an object of my invention to provide a machine of this type in which all operations for dividing and working the dough are performed automatically and reliably and to the exclusion of manual handling which should be avoided from the hygienic point of view, and in which the attendance required is a minimum.

To this end, in combination with a hopper which is charged with dough, I provide conveyors which engage and compress the dough and deliver it to cutting means by which it is divided longitudinally and transversely and the divided pieces are dropped by such cutting means onto a moving platform constituted by boards on the table of the machine which platform is fed forward intermittently and, each time it is thus fed, places a row of pieces below the working mechanism.

The several parts constituting my machine, for instance, the conveyors, the dividing means which comprise rotary and reciprocating cutters, and the working mechanism, are old in this art, but by combining them all into a single unit I have provided a machine which absolutely does away with manual handling of the dough.

It is another object of my invention to improve the details of construction, particularly as regards the parts by which motion is imparted to the several mechanisms of the unit.

It is another object of my invention to so design my machine that contact of the dough with metal parts is limited to the very short periods of dividing it. Such contact would be injurious because the dough when supplied to the hopper has been kneaded and is already in fermentation so that chilling by metal parts would interfere with the process. Therefore, all parts which act on the dough except the dividers, are made of, or lined with, a bad heat conductor.

It is another object of my invention to so arrange the dividing mechanism with respect to the table of the machine that the divided pieces are directly delivered to the fermentation boards on which they are worked and with which they are carried to the fermentation chambers.

A single attendant is enough for the operation of the machine. The duties of the attendant are only to keep the hopper supplied with dough and to see that a board is ready to receive the pieces which drop from the dividing mechanism. This requires cheap labour only and therefore the cost of operation is very low.

In the drawings a machine embodying my invention is illustrated somewhat diagrammatically by way of example.

Fig. 5 is a section on the line V—V of Fig. 3, on a larger scale, Figs. 6, 7 and 8 are diagrams in section on the line I—I of Fig. 2, showing various stages of operation.

Figure 1:
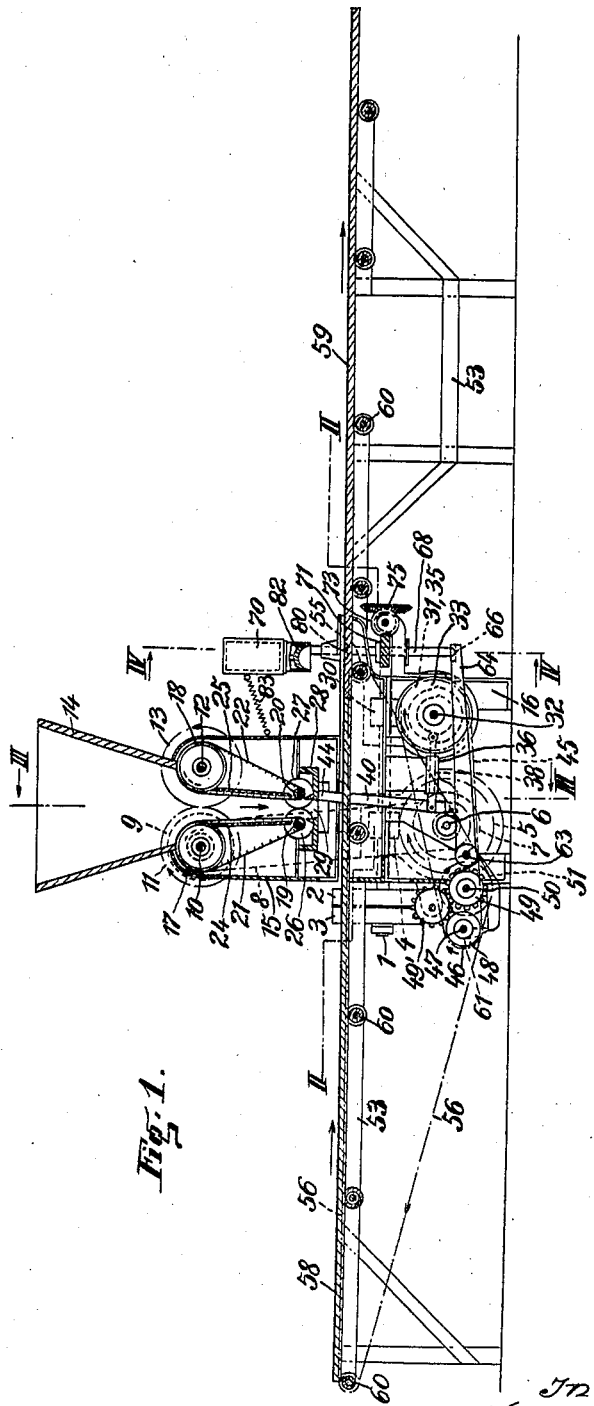
Fig. 1 is a sectional elevation of the machine on the line I—I of Fig. 2.

Referring now to the drawings, 53 is the table of the machine, 16 are its standards, 14 is the dough supply hopper, 21, 22 are two of its ten conveyor belts, 26 and 27 are the rotary and 40, 44 are the reciprocating cutting means of the dividing mechanism, 15 is a casing surrounding and partly supporting the conveyors and dividers, and 58, 59 are fermentation boards which are adapted to receive the divided pieces and to be displaced along the table 53 as indicated by the arrows in Fig. 1.

Figure 2:
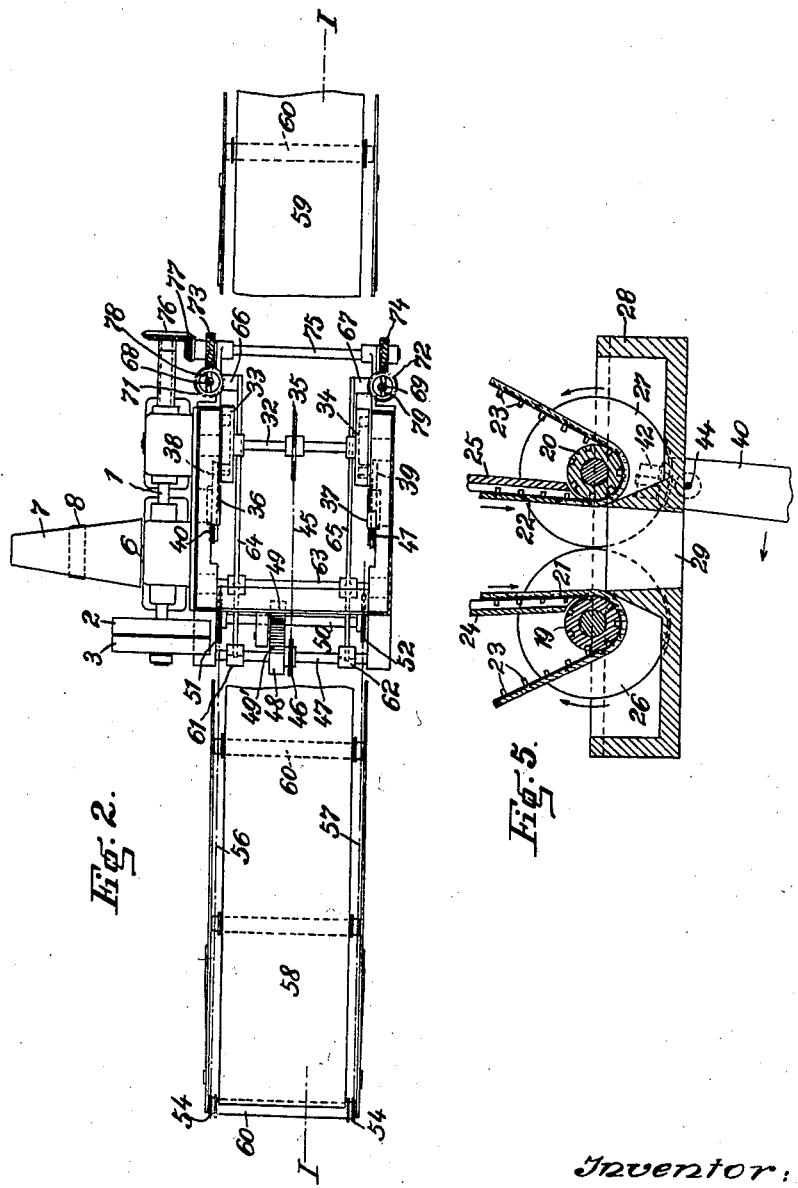
Fig. 2 is a plan view, partly in section on the line II—II of Fig. 1.
Figure 3:
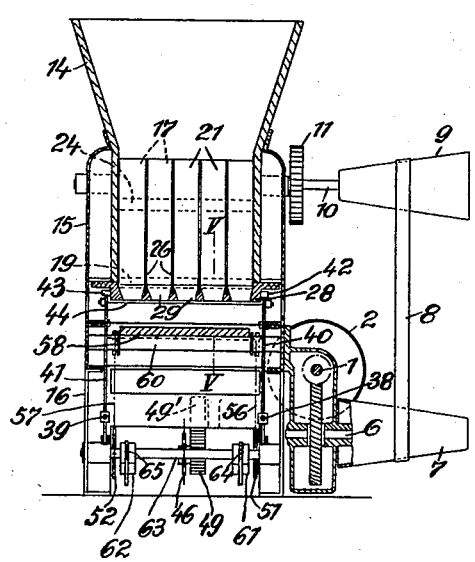
Figs. 3 and 4 are transverse sections on the lines III—III and IV—IV of Fig. 1, respectively.
Figure 4:
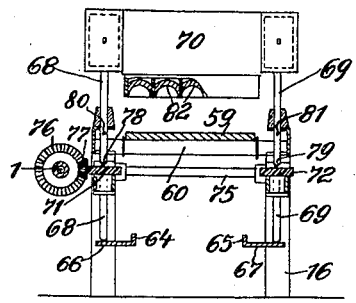

1, Fig. 2, is the main driving shaft of the machine, 2 and 3 are fast and loose pulleys on the shaft; 4, Fig. 1, is a worm on the end of the shaft adjacent the pulleys 2, 3; 6 is a shaft on which the wheel 5 for the worm 4 is keyed, and 7 is a conical pulley on the outer end of the shaft. 10 is a shaft in the casing 15 below the hopper 14, and 9 is a pulley on the outer end of said shaft which, as appears from Fig. 3, is reversed with respect to the lower pulley 7. The two conical pulleys are connected by a belt 8. 12 is a shaft arranged opposite the shaft 10, and 11 and 13 are spur gears on the respective shafts meshing with each other so that the shafts rotate in opposite directions. The casing 15 below the hopper 14 is supported on the standards 16 of the table 53.

17 and 18 are cylinders on the shafts 10 and 12, respectively, and each cylinder supports a set of conveyor belts 21, 22. In the present instance, five sets are carried on each roller making a total of ten conveyor belts but I am not limited to any definite number of belts. The conveyor belts are made of some non-metallic material in order to prevent injurious action on the dough, as mentioned, but are lined with metal plates or chains at the inner sides. 19 and 20 are cylinders of smaller diameter than the cylinders 17 and 18 and are so arranged below said upper cylinders that the adjacent reaches of the belts 21, 22 converge toward the lower cylinders 19, 20. The cylinders are notched as shown for the lower cylinders in Fig. 5, and lugs or teeth 23 are provided on the metal lining on the inside of the belts to engage the notches so that the belts will be positively driven by the rotation of the cylinders. Boards or other supports 24, 25 are arranged at the rear of the converging reaches to prevent yielding of the conveyors under the reaction of the dough. The boards are grooved for the teeth 23, and secured in the casing 15. Intermediate the conveyors, pairs of cutting blades 26, 27, of circular shape, are arranged on the cylinders 19 and 20 or, if the cylinders are subdivided for each conveyor belt, on the shafts of such cylinders. A trough-shaped plate 28, with a perforation 29 below each pair of conveyors, is secured in the casing 15 below the cylinders 19 and 20.

A second worm 30 is secured on the shaft 1 meshing with a worm wheel 31 on a shaft 32 which is carried in the standards 16. 33 and 34 are grooved cam plates at both ends of the shaft 32, and 35 is a sprocket at the centre of the shaft intermediate the cam plates. 38 and 39 are reciprocable bars which engage the grooves in the cam plates 33, 34 with pins at one end and the other ends are pivoted to vertical bars 40, 41 which are fulcrumed in the standards 16 at their lower ends and at their upper ends carry rollers 42 and 43 which engage the outer walls of the plate 28 on opposite sides. A wire 44 is extended between the bars 40, 41 below the plate 28 and this wire constitutes the transverse cutter.

45 is a chain extending from the sprocket 35 on the shaft 32 to a sprocket 46 on a shaft 47 carried in the front end of the standards 16. 48 is a spur gear on the same shaft the teeth of which are cut away for the most part and the few teeth which are left mesh with those of an intermediate wheel 49′ which in turn meshes with a spur gear 49 on a shaft 50 also carried in the standards 16. 51 and 52 are sprockets on the ends of this shaft, and 56 and 57 are chains meshing with the sprockets. These chains extend to pairs of sprockets 54 at the front end of the table 53 and to other pairs of sprockets 55 which are carried in the table at some distance to the rear of the casing 15 so that the chains move on a horizontal stretch intermediate the sprockets 54 and 55. The chains are provided with suitable dogs for engaging the fermentation boards 58, 59 on the table 53 and for displacing them to the rear. The dogs on the chains and the checks on the boards with which they cooperate have not been shown as such devices and their operation are understood by an expert without detailed representation. The boards are supported on rollers 60 which are rotatably carried in the table 53.

Cams 61 and 62 are keyed on the ends of the shaft 47, each cam having a single projection and 64, 65 are double armed levers on a shaft 63 the short arms of which are held engaged with the cams 61, 62 by the weight of the working mechanism 70 which is supported on their longer arms. 66, 67 are bearings at the ends of the longer arms, and 68, 69 are the vertical shafts of the working mechanism 70 which are abutted on the bearings 66, 67. 71, 72 are helical gears in which the vertical shafts are free to slide, the gears being supported on brackets in the standards 16 or held against vertical displacement by any other suitable means. 78, 79 are notches in the upper faces of the bosses of the gears which are adapted to be engaged by pins 80, 81 of the shafts 68, 69 when the working mechanism is in its operative position as will be described presently. Rotation is imparted to the helical gears by pinions 73, 74 on a shaft 75. 76 is a bevel gear on the rear end of the main shaft 1, Fig. 2, and 77 is a bevel pinion on the shaft 75.

The working mechanism 70 which is connected with the casing 15 by a spring 83, comprises five working cups 82 which are free to be displaced vertically and are rotated bodily from the shafts 68, 69 through the usual eccentric gears which are concealed in the casing of the working mechanism.

In operation, the dough is supplied to the hopper 14 without previous weighing and carried down between the converging stretches of the conveyor belts 21, 22. Cavities which may form between the several charges of dough when the hopper is being supplied, are filled in by the pressure exerted on the dough by the converging stretches of the belt and any fermentation gases will be expelled. The rotary blades 26 and 27 which rotate at comparatively high speed because the diameter of the cylinders 19, 20 is smaller than that of the driving cylinders 17, 18, divide the column of dough issuing from the space between the belts into longitudinal strips which enter the openings 29 in the plate 28. The blades assist the downward motion of the dough. The openings 29 may be of any suitable shape, they may be circular, oval, rectangular, square, etc., in plan and their area is reduced toward their lower openings.

When a suitable length of the column of dough has issued from the openings 29 the wire 44 is rapidly moved past the openings 29, for instance, from the right in Fig. 5 to the left, as indicated by the arrow, through the medium of the grooved cam plates 33, 34, the links 38, 39 and the bars 40, 41. The separated pieces of dough are deposited in a transverse row on the board 58 below the openings 29 which has been previously placed on the rollers 60 of the table 53.

Immediately before the bars 40, 41 start moving again, the teeth of the gear 48 engage those of the intermediate gear 49' and by these means the gear 49 and its shaft 50 and the sprockets 51, 52 on the shaft are rotated through a given angle in proportion to the number of teeth on the gear 48 and at the same time the board 58 is moved forward through a definite distance by the chains 56, 57 so that the pieces of the following row which are separated by the next operation of the wire 44 are dropped on an unoccupied space of the board 58.

Fig. 6 shows the position of the parts during the forward motion of the board 58 which pushes the board 59 before it, Fig. 7 shows their position immediately after the boards have been arrested and after the pieces of dough have been separated by the wire 44. Before the boards are started moving again the cams 61, 62 have come in contact with the short arms of the double-armed levers 64, 65 and have depressed these arms, raising the long arms and lifting the working mechanism 70 through the medium of the bearings 66, 67 and the shafts 68, 69. The cups 82 are lifted from the pieces they had previously worked, and the pins 80, 81 are lifted out of the notches in the bosses of the helical wheels 71, 72 so that the rotary motion of the cups is arrested. This position is shown in Fig. 6. In the meantime the boards 58, 59 are moved forward to the right in Fig. 7, placing the next row of pieces below the working mechanism 70. As soon as the boards have been arrested, the double-armed levers 64, 65 are released by the cams 61, 62 and the shafts 68, 69 with the working mechanism 70 are allowed to descend, the shafts being coupled with their helical wheels 71, 72 by the pins 80, 81 engaging the notches 78, 79. The working mechanism is now started and works the row of pieces below it.

The object of the spring 83 is to arrest the working mechanism 70 at an invariable distance from the casing 15 when it has ceased to operate, so that the working cups will be in the correct position with respect to the row of pieces below them which they are to work during the following operation.

Fig. 8 shows the position of parts during the issuing of the dough which has been divided longitudinally by the blades 26, 27, from the openings 29, and during the operation of the working mechanism 70. The cams 61, 62 are going to raise the working mechanism through the levers 64, 65, as described, and the teeth of the gear 48 are going to mesh with those of the intermediate gear 49' upon rotation of which the boards 58, 59 are moved forward to the right. The pins at the ends of the links 38, 39 are in the grooves of the cam plates 33, 34 at a short distance in front of the point from which they are moved to the right when the boards 58, 59 have been arrested and cause the bars 40, 41 to move the wire past the openings 29.

The speed of the conveyor belts 21, 22 and the speed at which they move the column of dough through the openings 29, that is, the size of the pieces separated by the wire 44, may be regulated by displacing the belt 8 on its conical pulleys 7 and 9. By means of this very simple change speed gear—in place of which any other suitable gear might be provided—it is possible to vary the size of the pieces much more simply than in the existing machines in which a separate dividing mechanism must be provided for each size.

The transverse cutter operates rapidly and reliably because its wire 44 which is the principal part of the device, is moved through the dough extruded from the openings 29 by jerks.

The described connection of the working mechanism 70 with its drive 71 to 75 by means of the pins 80, 81 which cooperate intermittently with the notches 78, 79 of the bosses of the helical gears, is thoroughly reliable and at the same time, very simple.

I claim:

1. A machine for dividing and working dough comprising a supply hopper, a vertical conveyor arranged below said hopper and adapted to form and to compress a column of dough from said hopper, mechanism operatively connected with said conveyor for dividing the column longitudinally, for sizing the column, for dividing the sized column transversely, a platform adapted to receive the pieces divided from the column, mechanism for working the pieces, means for intermittently moving said platform with respect to said working and said dividing mechanisms, said working mechanism and said means being also operatively connected with said conveyor, means for driving said conveyor, and automatic means for timing the cooperation of the parts operatively connected with said conveyor.

2. A machine for dividing and working dough comprising a supply hopper, mechanism for dividing and working the dough, a conveyor adapted to carry dough from said hopper to said mechanism, means for feeding the divided pieces of dough to said working mechanism, a drive for said mechanisms and means, and automatic means for so timing their cooperation that the conveyor is operated continuously and the dividing and working mechanisms are inoperative during the operation of said feeding means.

3. A device of the class described, comprising a hopper adapted to receive a mass of dough, a pair of endless conveyors for drawing said mass from the hopper into a continuous column of dough, means for splitting said column longitudinally into strips, means for cutting said strips transversely into pieces of loaf size, a plurality of shaping mechanisms, driving means for said shaping mechanisms, conveyors for feeding said pieces into position to be operated on by said shaping mechanisms, and means for periodically moving said shaping mechanisms into inoperative position, said last mentioned means being operative to disconnect said mechanisms from their driving means.

4. A machine for dividing and working dough comprising mechanism for dividing the dough, mechanism for working it comprising a casing, vertical shafts on which said casing is supported, said shafts being adapted to move vertically together with said casing, means for driving said shafts, levers on which said shafts are carried at their lower ends, means for operating said levers so as to raise and lower said shafts and said casing, means for connecting and disconnecting said shafts with respect to their driving means, as they are raised and lowered, means for conveying the divided pieces of dough from said dividing mechanism to said working mechanism, a drive for said mechanisms and means, and automatic means for timing their cooperation.

5. A device of the class described, comprising a loaf-receiving element, means for intermittently advancing said element, means for dividing a mass of dough into pieces of loaf size and depositing the pieces on said loaf-receiving element, a mechanism associated with said loaf-receiving element for shaping said pieces into loaves, driving means for said mechanism, and means for periodically moving said mechanism to inoperative position, said last mentioned means being operative to disconnect said mechanism from its driving means.

6. A device of the class described, comprising a receptacle for dough, means for withdrawing a column of dough from said receptacle while expressing gases from said column, said means comprising a pair of converging endless conveyors, means for dividing said column into strips and means for dividing said strips into pieces of loaf size.

In testimony whereof I affix my signature.

WILHELM MOHR.